US011199099B2

United States Patent
Crites et al.

(10) Patent No.: US 11,199,099 B2
(45) Date of Patent: Dec. 14, 2021

(54) GAS TURBINE ENGINES WITH IMPROVED AIRFOIL DUST REMOVAL

(71) Applicant: HONEYWELL INTERNATIONAL INC., Morris Plains, NJ (US)

(72) Inventors: Daniel C. Crites, Mesa, AZ (US);
Michael Kahrs, Phoenix, AZ (US);
Brandan Wakefield, Phoenix, AZ (US);
Ardeshir Riahi, Scottsdale, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 16/826,953

(22) Filed: Mar. 23, 2020

(65) Prior Publication Data
US 2020/0378262 A1    Dec. 3, 2020

Related U.S. Application Data

(63) Continuation of application No. 15/810,809, filed on Nov. 13, 2017, now Pat. No. 10,641,106.

(51) Int. Cl.
*F01D 5/18*    (2006.01)

(52) U.S. Cl.
CPC ............. *F01D 5/187* (2013.01); *F01D 5/186* (2013.01); *F05D 2220/32* (2013.01);
(Continued)

(58) Field of Classification Search
None
See application file for complete search history.

(56) References Cited

U.S. PATENT DOCUMENTS 4,278,400 A * 7/1981 Yamarik ................. F01D 5/187
                                                      415/115
4,514,144 A    4/1985 Lee
(Continued)

FOREIGN PATENT DOCUMENTS

GB    1350424    4/1974
WO    2016/148693 A1    9/2016

OTHER PUBLICATIONS

Kliuev, M., "EDM Drilling and Shaping of Cooling Holes in Inconel 718 Turbine Blades," 18th CIRP Conference on Electro Physical and Chemical Machining (ISEM XVIII), Procedia CIRP 42 (2016), Oct. 2016, p. 322-327, available online at: www.sciencedirect.com.

*Primary Examiner* — David E Sosnowski
*Assistant Examiner* — Jason Fountain
(74) *Attorney, Agent, or Firm* — Lorenz & Kopf, LLP (57) ABSTRACT

An airfoil for a rotor blade in a gas turbine engine includes a first side wall and a second side wall joined to the first side wall at a leading edge and a trailing edge. The airfoil further includes a tip cap extending between the first and second side walls such that the tip cap and at least portions of the first and second side walls form a blade tip and an internal cooling system. The internal cooling system includes a leading edge cooling circuit, a central cooling circuit, and a trailing edge cooling circuit. Each of the internal passages within the leading edge cooling circuit, the central cooling circuit, and the trailing edge cooling circuit is bounded in the radial outward direction with a surface that has at least one escape hole or that is positively angled in the radial outward direction relative to a chordwise axis.

16 Claims, 7 Drawing Sheets

(52) U.S. Cl.
CPC ...... *F05D 2230/50* (2013.01); *F05D 2240/30* (2013.01); *F05D 2240/307* (2013.01); *F05D 2260/201* (2013.01); *F05D 2260/202* (2013.01); *F05D 2260/2212* (2013.01); *F05D 2260/607* (2013.01)

(56) References Cited

U.S. PATENT DOCUMENTS

| | | | |
|---|---|---|---|
| 4,820,123 | A | 4/1989 | Hall |
| 5,062,768 | A | 11/1991 | Marriage |
| 5,403,159 | A | 4/1995 | Green et al. |
| 5,700,131 | A | 12/1997 | Hall et al. |
| 5,902,093 | A | 5/1999 | Liotta et al. |
| 6,206,638 | B1 | 3/2001 | Glynn et al. |
| 6,227,804 | B1 * | 5/2001 | Koga ................... F01D 5/187 415/115 |
| 6,413,044 | B1 | 7/2002 | Roeloffs et al. |
| 6,471,479 | B2 | 10/2002 | Starkweather |
| 6,474,947 | B1 | 11/2002 | Yur |
| 6,491,496 | B2 | 12/2002 | Starkweather |
| 6,527,514 | B2 | 3/2003 | Roeloffs |
| 6,595,748 | B2 | 7/2003 | Flodman et al. |
| 6,595,750 | B2 | 7/2003 | Parneix et al. |
| 6,874,992 | B2 | 4/2005 | Dailey |
| 7,246,999 | B2 | 7/2007 | Manning et al. |
| 7,287,959 | B2 | 10/2007 | Lee et al. |
| 7,377,747 | B2 | 5/2008 | Lee |
| 7,632,071 | B2 | 12/2009 | Charbonneau et al. |
| 7,645,122 | B1 | 1/2010 | Liang |
| 7,654,795 | B2 | 2/2010 | Tibbott |
| 7,665,965 | B1 | 2/2010 | Liang |
| 7,780,414 | B1 * | 8/2010 | Liang ................... F01D 5/187 416/97 R |
| 7,857,587 | B2 | 12/2010 | Correia et al. |
| 7,862,299 | B1 | 1/2011 | Liang |
| 7,988,417 | B1 * | 8/2011 | Liang ................... F01D 5/20 416/90 R |
| 8,142,153 | B1 | 3/2012 | Liang |
| 8,240,994 | B2 | 8/2012 | Ireland et al. |
| 8,777,567 | B2 | 7/2014 | Poon et al. |
| 8,807,943 | B1 * | 8/2014 | Liang ................... F01D 5/187 416/97 R |
| 8,851,848 | B1 | 10/2014 | Liang |
| 8,920,123 | B2 | 12/2014 | Lee |
| 9,051,842 | B2 | 6/2015 | Smith et al. |
| 9,206,697 | B2 | 12/2015 | Tibbott et al. |
| 9,546,554 | B2 | 1/2017 | Crites et al. |
| 9,856,739 | B2 | 1/2018 | Bedrosyan et al. |
| 9,932,837 | B2 * | 4/2018 | Corcoran ................ F01D 5/186 |
| 10,683,763 | B2 * | 6/2020 | Halfmann ............... F01D 5/188 |
| 2002/0119045 | A1 | 8/2002 | Starkweather |
| 2002/0119047 | A1 | 8/2002 | Starkweather |
| 2006/0073015 | A1 | 4/2006 | Liang |
| 2012/0070308 | A1 | 3/2012 | Naik et al. |
| 2013/0177446 | A1 | 7/2013 | Smith et al. |
| 2014/0083116 | A1 | 3/2014 | Crites et al. |
| 2014/0219813 | A1 | 8/2014 | Perez et al. |
| 2015/0078916 | A1 | 3/2015 | Bedrosyan et al. |
| 2015/0104326 | A1 | 4/2015 | Waldman et al. |
| 2015/0104327 | A1 | 4/2015 | Malak et al. |
| 2016/0024936 | A1 * | 1/2016 | Corcoran ................ F01D 5/187 416/95 |
| 2016/0169052 | A1 | 6/2016 | Balliel et al. |
| 2018/0094527 | A1 * | 4/2018 | Halfmann ............... F01D 5/082 |

* cited by examiner

GAS TURBINE ENGINES WITH IMPROVED AIRFOIL DUST REMOVAL

CROSS-REFERENCE TO RELATED APPLICATION

This application is a continuation of U.S. patent application Ser. No. 15/810,809 filed on Nov. 13, 2017. The relevant disclosure of the above application is incorporated herein by reference.

STATEMENT REGARDING FEDERALLY SPONSORED RESEARCH OR DEVELOPMENT

This invention was made with Government support under W58RGZ-16-C-0046 awarded by the US Army. The Government has certain rights in the invention.

TECHNICAL FIELD

The present invention generally relates to gas turbine engines, and more particularly relates to gas turbine engines with improved dust particle removal in turbine airfoils.

BACKGROUND

Gas turbine engines are generally used in a wide range of applications, such as aircraft engines and auxiliary power units. In a gas turbine engine, air is compressed in a compressor, and mixed with fuel and ignited in a combustor to generate hot combustion gases, which flow downstream into a turbine section. In a typical configuration, the turbine section includes rows of airfoils, such as stator vanes and rotor blades, disposed in an alternating sequence along the axial length of a generally annular hot gas flow path. The rotor blades are mounted at the periphery of one or more rotor disks that are coupled in turn to a main engine shaft. Hot combustion gases are delivered from the engine combustor to the annular hot gas flow path, thus resulting in rotary driving of the rotor disks to provide an engine output.

Due to the high temperatures in many gas turbine engine applications, it is desirable to regulate the operating temperature of certain engine components, particularly those within the mainstream hot gas flow path in order to prevent overheating and potential mechanical issues attributable thereto. As such, it is desirable to cool the airfoils of the rotor blades and stator vanes to prevent or reduce adverse impact and extend useful life. Mechanisms for cooling turbine airfoils include ducting cooling air through internal passages and then venting the cooling air through holes formed in the airfoil. Internal and film cooling techniques attempt to maintain temperatures that are suitable for material and stress level. However, given the high temperature of engine operation, cooling remains a challenge. This is particularly relevant in dusty or dirty environments in which dust may become lodged within the airfoil to block and/or impact cooling efforts.

Accordingly, it is desirable to provide gas turbine engines with improved temperature management, including mitigating or preventing adverse issues associated with dust particles. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, an airfoil for a rotor blade in a gas turbine engine includes a first side wall and a second side wall joined to the first side wall at a leading edge and a trailing edge. The first and second side walls extend in a radial outward direction from a base coupled to an airfoil platform. The airfoil further includes a tip cap extending between the first and second side walls such that the tip cap and at least portions of the first and second side walls form a blade tip and an internal cooling system arranged within the first and second side walls configured to direct cooling air from one or more source passages, through the airfoil, and out of the airfoil. The internal cooling system includes a leading edge cooling circuit, a central cooling circuit, and a trailing edge cooling circuit. The internal cooling system further includes tip slots formed in the blade tip and trailing edge slots formed in the trailing edge. The leading edge cooling circuit, the central cooling circuit, and the trailing edge cooling circuit are formed by a plurality of internal passages fluidly coupled to the one or more source passages. Each of the internal passages within the leading edge cooling circuit, the central cooling circuit, and the trailing edge cooling circuit is bounded in the radial outward direction with a surface that has at least one escape hole or that is positively angled in the radial outward direction relative to a chordwise axis.

In accordance with another exemplary embodiment, a method is provided for producing an airfoil of a rotor blade for a gas turbine engine. The method includes providing a baseline airfoil with an internal cooling system defined by internal walls configured to direct cooling air from one or more source passages, through the airfoil, and out of the airfoil, wherein the internal cooling system includes a leading edge cooling circuit, a central cooling circuit, and a trailing edge cooling circuit; evaluating the internal walls and identifying stagnation areas; providing a modified airfoil from the baseline airfoil by adding escape holes within the internal walls in the stagnation areas; and producing the modified airfoil.

Further provided according to various embodiments is an airfoil for a rotor blade in a gas turbine engine. The airfoil includes a first side wall and a second side wall joined to the first side wall at a leading edge and a trailing edge. The first and second side walls extend in a radial outward direction from a base coupled to an airfoil platform. The airfoil includes a tip cap extending between the first and second side walls such that the tip cap and at least portions of the first and second side walls form a blade tip. The airfoil includes an internal cooling system arranged within the first and second side walls configured to direct cooling air from one or more source passages, through the airfoil, and out of the airfoil. The internal cooling system includes a leading edge cooling circuit, a central cooling circuit, and a trailing edge cooling circuit. The internal cooling system further includes tip slots formed in the blade tip and trailing edge slots formed in the trailing edge. The leading edge cooling circuit, the central cooling circuit, and the trailing edge cooling circuit are formed by a plurality of internal passages fluidly coupled to the one or more source passages, and each of the internal passages within the leading edge cooling circuit, the central cooling circuit, and the trailing edge cooling circuit is bounded in the radial outward direction with a surface that has at least one escape hole or that is positively angled in the radial outward direction relative to a chordwise axis. The trailing edge cooling circuit includes: a first set of serpentine passages formed by a first trailing radial passage extending in the radial outward direction from the one or more source passages, a second trailing radial passage extending in a radial inward direction from the first trailing radial passage at a first transition, and a third trailing radial passage extending from the second trailing radial passage in the radial outward direction, and the third trailing radial passage extending in the radial outward direction and being formed by a first radial wall in a chordwise forward direction and a second radial wall in a chordwise aft direction; and a trailing edge chamber being at least partially formed by the second radial wall in the chordwise forward direction and the trailing edge in the chordwise aft direction, the second radial wall defining holes that fluidly couple the third trailing radial passage to the trailing edge chamber. The trailing edge chamber is fluidly coupled to the trailing edge slots and is bounded in the radial outward direction by the tip cap such that at least a portion of the tip slots form the at least one escape hole for the trailing edge chamber.

Also provided accordance with various embodiments is an airfoil for a rotor blade in a gas turbine engine. The airfoil includes a first side wall and a second side wall joined to the first side wall at a leading edge and a trailing edge. The first and second side walls extend in a radial outward direction from a base coupled to an airfoil platform. The airfoil includes a tip cap extending between the first and second side walls such that the tip cap and at least portions of the first and second side walls form a blade tip. The airfoil includes an internal cooling system arranged within the first and second side walls configured to direct cooling air from one or more source passages, through the airfoil, and out of the airfoil. The internal cooling system includes a leading edge cooling circuit, a central cooling circuit, and a trailing edge cooling circuit, the internal cooling system further including tip slots formed in the blade tip and trailing edge slots formed in the trailing edge. The leading edge cooling circuit, the central cooling circuit, and the trailing edge cooling circuit are formed by a plurality of internal passages fluidly coupled to the one or more source passages. Each of the internal passages within the leading edge cooling circuit, the central cooling circuit, and the trailing edge cooling circuit is bounded in the radial outward direction with a surface that has at least one escape hole or that is positively angled in the radial outward direction relative to a chordwise axis. The trailing edge cooling circuit includes: a first radial passage extending in the radial outward direction and being formed by a first radial wall in a chordwise forward direction and a second radial wall in a chordwise aft direction; and a trailing edge chamber being formed by the second radial wall in the chordwise forward direction and the trailing edge in the chordwise aft direction, the second radial wall defining holes that fluidly couple the first radial passage to the trailing edge chamber. The trailing edge chamber is fluidly coupled to the trailing edge slots and is bounded in the radial outward direction by the tip cap such that at least a portion of the tip slots form the at least one escape hole for the trailing edge chamber.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments discussed herein include gas turbine engines with turbine components having improved cooling characteristics and temperature management. In particular, exemplary embodiments include turbine airfoils with internal features that facilitate dust removal. Such dust removal prevents accumulation within the cooling circuits, thereby providing more efficient and/or improved cooling characteristics.

Figure 1:
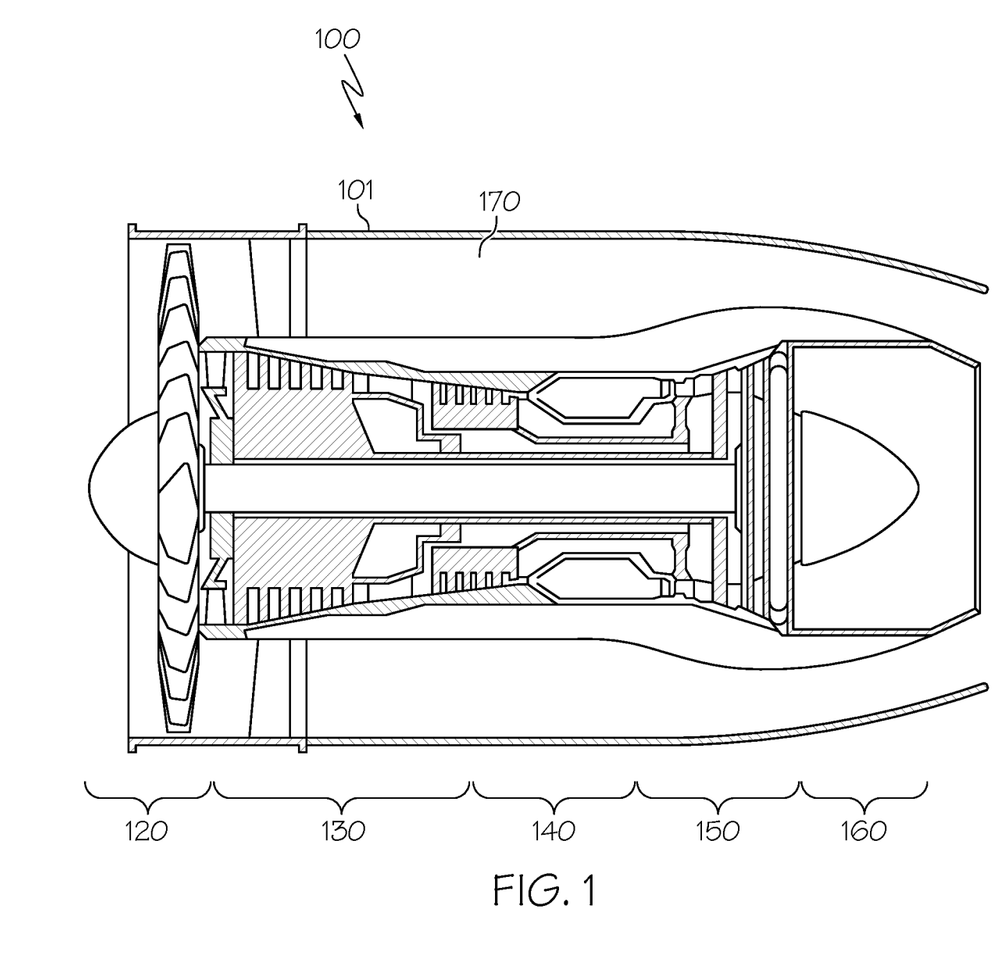
FIG. 1 is a partial cross-sectional view of a gas turbine engine in accordance with an exemplary embodiment.

FIG. 1 is a cross-sectional view of a gas turbine engine 100 according to an exemplary embodiment. Although FIG. 1 depicts a turbofan engine, in general, exemplary embodiments discussed herein may be applicable to any type of engine, including turboshaft engines. The gas turbine engine 100 may form part of, for example, an auxiliary power unit for an aircraft or a propulsion system for an aircraft. The gas turbine engine 100 has an overall construction and operation that is generally understood by persons skilled in the art. The gas turbine engine 100 may be disposed in an engine case 101 and may include a fan section 120, a compressor section 130, a combustion section 140, a turbine section 150, and an exhaust section 160. The fan section 120 may include a fan, which draws in and accelerates air. A fraction of the accelerated air from the fan section 120 is directed through a bypass section 170 to provide a forward thrust. The remaining fraction of air exhausted from the fan is directed into the compressor section 130.

The compressor section 130 may include a series of compressors that raise the pressure of the air directed into it from the fan section 120. The compressors may direct the compressed air into the combustion section 140. In the combustion section 140, the high pressure air is mixed with fuel and combusted. The combusted air is then directed into the turbine section 150. As described in further detail below, the turbine section 150 may include a series of rotor and stator assemblies disposed in axial flow series. The combusted air from the combustion section 140 expands through the rotor and stator assemblies and causes the rotor assemblies to rotate a main engine shaft for energy extraction. The air is then exhausted through a propulsion nozzle disposed in the exhaust section 160 to provide additional forward thrust.

Figure 2:
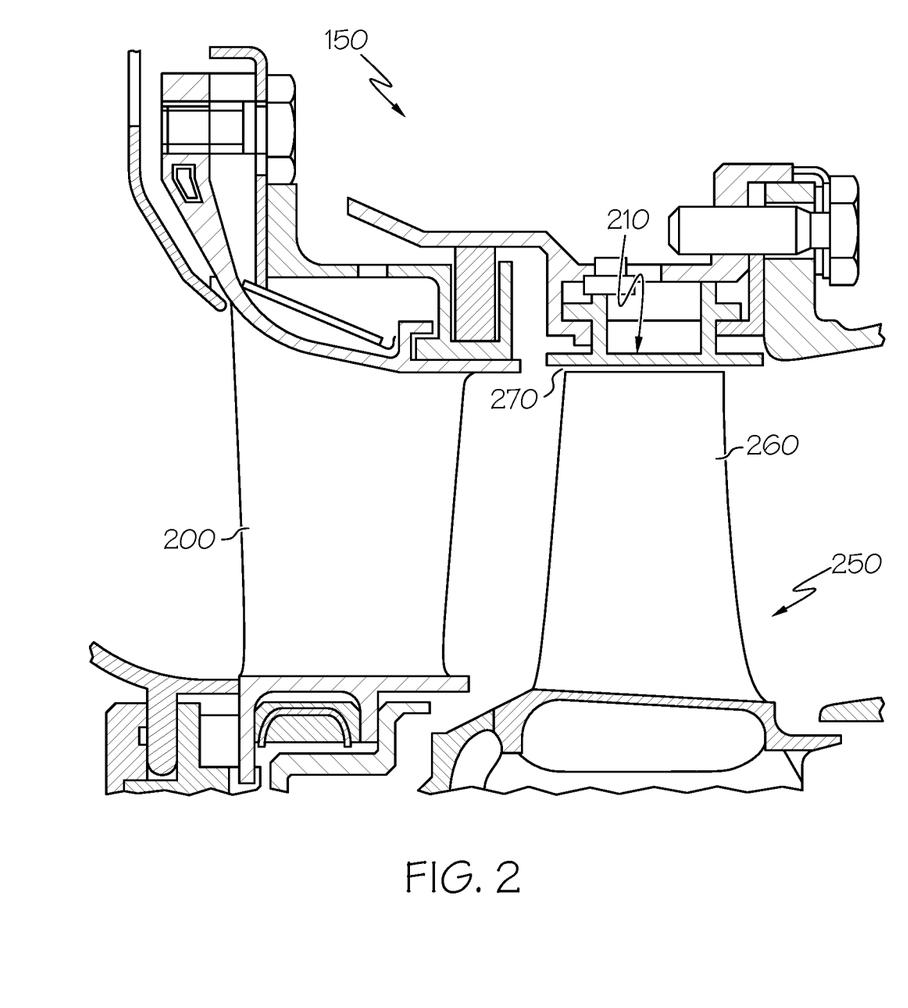
FIG. 2 is a partial, sectional elevation view illustrating a portion of a turbine section of the gas turbine engine of FIG. 1 in accordance with an exemplary embodiment.

FIG. 2 is a partial cross-sectional side view of a turbine section of an engine, such as the turbine section 150 of engine 100 of FIG. 1 in accordance with an exemplary embodiment. The turbine section 150 includes a turbine stator 200 and a turbine rotor 250 surrounded by a shroud 210 defining a gas flow path through which hot, combusted air from an upstream combustion section (e.g. combustion section 140 of FIG. 1) is directed. Although only one turbine stator 200 and one turbine rotor 250 are shown, such stators 200 and rotors 250 are typically arranged in alternating axially spaced, circumferential rows. As used herein, the term "axial" refers to a direction generally parallel to the engine centerline, while the term "radial" refers to a direction generally perpendicular to the engine centerline.

The rotor 250 generally includes rotor blades 260 (one of which is shown) mounted on a rotor disc (not shown), which in turn is coupled to an engine shaft (not shown). The turbine stator 200 directs the air toward the turbine rotor 250. The air impinges upon rotor blades 260 of the turbine rotor 250, thereby driving the turbine rotor 250 for power extraction. To allow the turbine section 150 to operate at desirable elevated temperatures, certain components are cooled, including the rotor 250 and the stator 200, as described in greater detail below.

Figure 3:
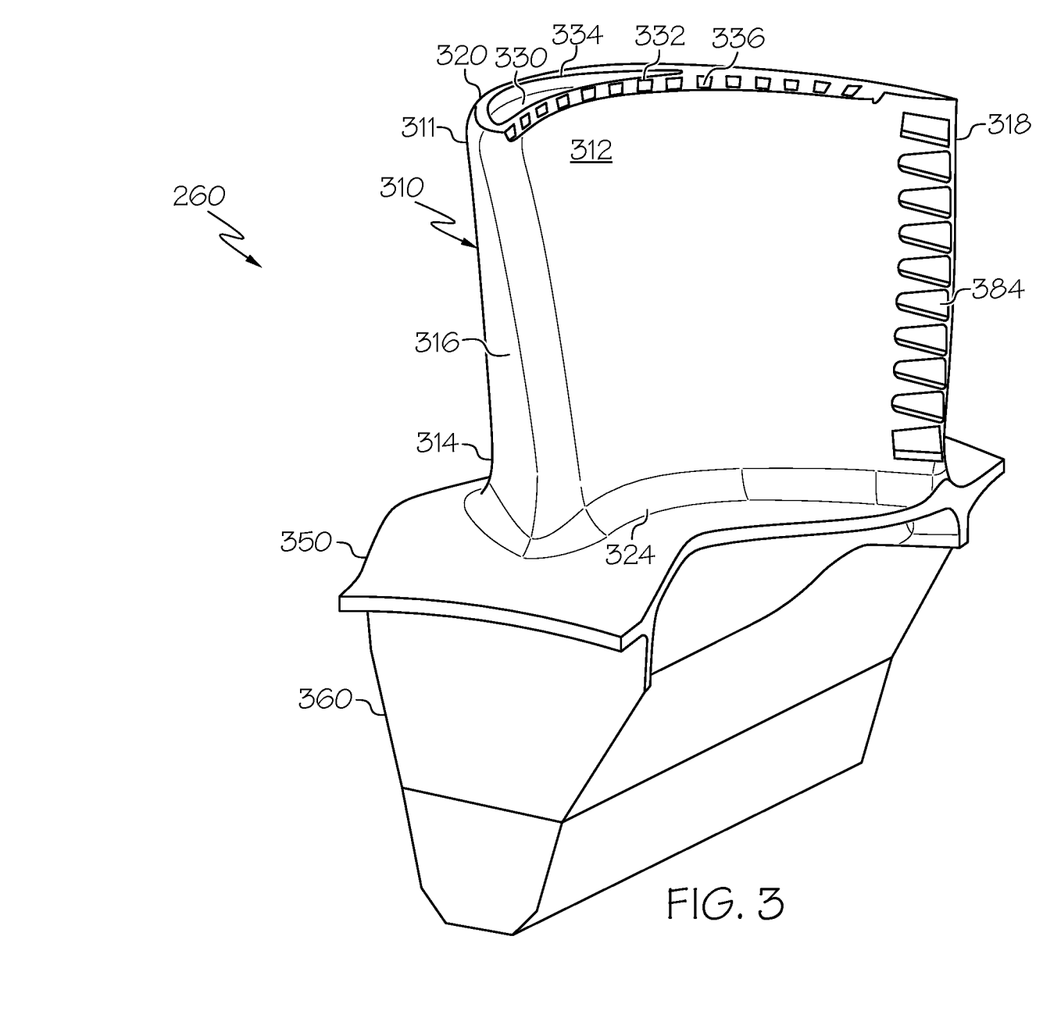
FIG. 3 is an isometric view of a turbine rotor blade of the turbine section of FIG. 2 in accordance with an exemplary embodiment.

FIG. 3 illustrates an exemplary aircraft jet engine turbine rotor blade, such as rotor blade 260 of FIG. 2, removed from a turbine section. FIG. 3 depicts one exemplary embodiment, and other exemplary embodiments may have alternate configurations or arrangements.

The rotor blade 260 includes an airfoil 310, a platform 350 and a root 360. The platform 350 is configured to radially contain turbine airflow within a shroud (e.g., shroud 210 of FIG. 2). The root 360 extends from the underside of the platform 350 and is configured to couple the blade 260 to a turbine rotor disc (not shown). In general, the rotor blade 260 may be made from any suitable material, including high heat and high stress resistant aerospace alloys, such as nickel based alloys, Rene 88, Mar-M-247, single crystal materials, steels, titanium alloys or the like.

The airfoil 310 projects radially outwardly from the platform 350. The airfoil 310 is formed by a body 311 with two side (or outer) walls 312, 314, each having outer surfaces that together define an airfoil shape. The first side wall 312 defines a pressure side with a generally concave shape, and the second side wall 314 defines a suction side with a generally convex shape. In a chordwise direction, the airfoil side walls 312, 314 are joined at a leading edge 316 and a trailing edge 318. The trailing edge 318 may include trailing edge slots 384, discussed below.

In a radial direction, the airfoil side walls 312, 314 extend from a base 324 at the platform 350 to a blade tip 320. In general, the blade tip 320 is positioned to rotate in close proximity to the shroud 210 (FIG. 2) in order to maximize energy extraction. In one embodiment, the tip 320 may be formed by a tip cap 330 that is recessed slightly relative to tip extensions 332, 334 on each side wall 312, 314. One or both of the tip extensions 332, 334 may define tip slots 336 to cool the tip 320 and/or to mitigate tip leakage between the tip 320 and shroud. The tip slots 336 may be considered to extend from an internal cooling circuit, through the tip cap 320, and through the respective tip extension 332, 334. As described below, the tip slots 336 may also facilitate dust removal.

In some embodiments, the tip extensions 332, 334 are curved or otherwise inclined in a forward direction relative to a radial axis (or plane) that otherwise extends through the respective pressure side wall 312, 314. For example, the tip extensions 332, 334 may be inclined approximately 15-60°, although any suitable angle (or no angle) may be provided. A row of tip slots 336 extend along the chord-length of one or both tip extensions 332, 334. As an example, each tip slots 336 may have a diameter in a range of about 0.20 mm to about 0.70 mm, as an example, and other diameters may be provided. In the one exemplary embodiment, each tip slots 336 has an outlet on a radial wall of the tip extension 332, 334, while in other embodiments, the outlet may be positioned on the forward or aft walls.

In one exemplary embodiment, each tip slots 336 converges along the length between an inlet and an outlet in one or more dimensions. In particular, each tip slots 336 has a cross-sectional area that decreases along the length. In one exemplary embodiment, the cross-sectional area continuously decreases along the length. The converging nature of the tip slots 336 results in an increased flow velocity while preventing or mitigating pressure losses at the hole inlet, thereby maximizing the pressure of the air flow through the outlet. The inlet to exit area ratio can typically vary between 1.5 to 2, although other area ratios may be provided. Additional information regarding the tip slots 336 and/or blade tip 320 may be found, for example, in patent application Ser. No. 14/030,647, filed Sep. 18, 2013 and incorporated herein by reference.

As noted above, the rotor blade 260, particularly the airfoil 310, is subject to extremely high temperatures resulting from high velocity hot gases ducted from the combustion section 140 (FIG. 2). If unaddressed, the extreme heat may impact the useful life of an airfoil and/or impact the maximum operating temperature of the engine. As such, cooling is provided for the airfoil 310 to maintain blade temperature at an acceptable level Such cooling may include an internal cooling system that directs cooling air from the compressor section 130 into inlets in the root 360 and through internal cavities and passages to cool the airfoil 310 via convection and conduction. The air flowing through the internal cooling system may flow out of the airfoil 310 through the trailing edge slots 384 to provide temperature control of the trailing edge 318 and through tip slots 336 at the tip 320. Additionally, the cooling air flowing through the internal cooling system may also be supplied to film cooling holes (not shown) arranged to provide a cooling film of fluid onto the surface of the airfoil 310. Such film cooling holes may be provided in various locations, such as in the area of the leading edge 316 or at any chordwise location along the pressure side wall 312 and/or suction side wall 314.

In some environments, air entering the engine may contain dust or particles (generally, "dust") such that the cooling air from the compressor may also contain dust. As described below, the airfoil 310 may particularly be configured to accommodate the dust resulting from operation within dusty or dirty environments, for example, by preventing or mitigating the accumulation and possible blocking of portions of the internal cooling system, which unless otherwise addressed may adversely impact the cooling efficiency.

Figure 4:
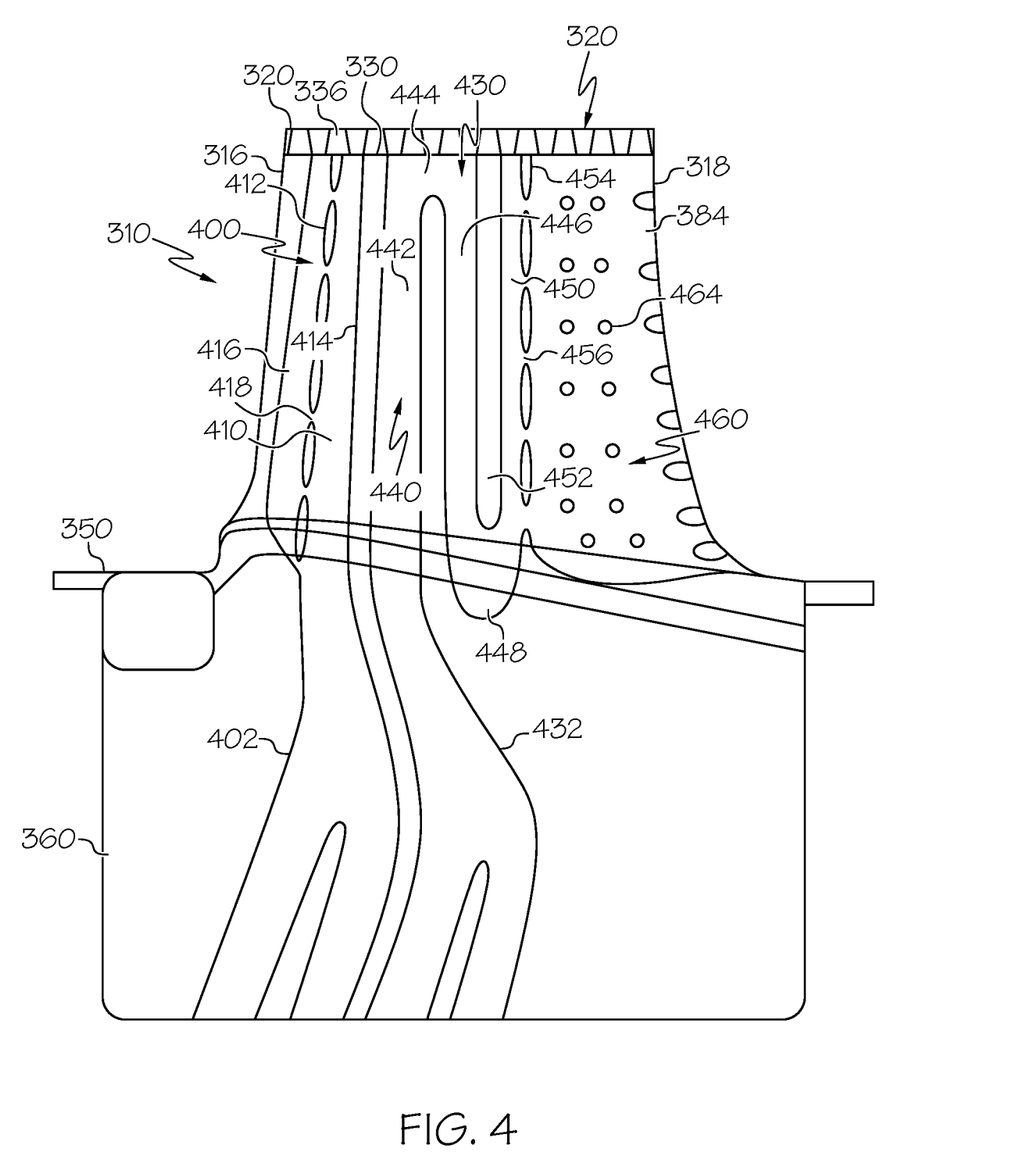
FIG. 4 is a cross-sectional view of the turbine rotor blade of FIG. 3 in accordance with an exemplary embodiment.

FIG. 4 is a partial cross-sectional view of the rotor blade 260 of FIG. 3 in accordance with an exemplary embodiment. As shown, the cross-sectional view may generally correspond to a cross-sectional view through a radial-chordwise plane. In the discussion of FIG. 4, the term "chordwise" refers to a generally longitudinal dimension along the airfoil from leading edge to trailing edge, typically curved for air flow characteristics. As noted above, the term "radial" refers to directions generally perpendicular to the engine centerline, which in the view of FIG. 4 refers to the dimension between root 360 and tip 320, perpendicular to the chordwise dimension. The term "tangential" refers to the dimension that is perpendicular to the chordwise and radial dimensions, e.g., into the page of FIG. 4. Directions within these dimensions may also be referenced below. For example, the term "radial outward direction" refers to a direction along the radial dimension toward the blade tip 320, and the term "radial inward direction" refers to a direction along the radial dimension toward the root 360. As another example, the term "chordwise forward direction" refers to a direction along the chordwise dimension toward the leading edge 316, and the term "chordwise aft direction" refers to a direction along the chordwise dimension toward the trailing edge 318.

As discussed above with reference to FIG. 3, the rotor blade 260 of FIG. 4 includes the platform 350 and the airfoil 310 with leading edge 316, trailing edge 318, tip slots 336, trailing edge slots 384, and blade tip 320. FIG. 4 additionally shows the interior structure of the rotor blade 260 that includes an internal cooling system formed by two cooling circuits 400, 430, although any number of cooling circuits may be provided. The cooling circuits 400, 430 direct cooling air from passages 402, 432 in the root 360 (FIG. 3) and/or rotor discs (not shown) to cool designated portions of the airfoil 310. In this embodiment, cooling circuit 400 receives cooling air from source passage 402, and cooling circuit 430 receives cooling air from source passage 432. Such cooling air may be obtained as bleed flow from the compressor section 130 (FIG. 1). As described below, the cooling circuits 400, 430 are formed by the side walls 312, 314 and internal structures that direct the air flow through the airfoil 310. Generally, the first cooling circuit 400 may be considered a leading edge cooling circuit; and the second cooling circuit 430 may be considered a central cooling circuit, a trailing edge cooling circuit, or a combination of a central cooling circuit and a trailing edge cooling circuit.

The first cooling circuit 400 includes a first passage (or chamber) 410 extending in a generally radial direction, as shown in FIG. 4. The first passage 410 is partially formed by internal walls 412, 414, although other embodiments may have alternate configurations. The forward or leading internal wall 412 forms a leading edge passage (or chamber) 416 with the interior surfaces of the side walls 312, 314 (FIG. 3) at the leading edge 316. As shown, the leading edge passage 416 extends in a radial dimension along the length of the leading edge 316. The leading internal wall 412 has a number of holes (or nozzles) 418 such that the first passage 410 and the leading edge passage 416 are in fluid communication. The first passage 410 and leading edge passage 416 may be bounded in the radial outward direction by tip cap 330.

Accordingly, during operation, a first portion of cooling air flows through the first passage 410, through the holes 418 in the internal wall 412, and through the leading edge passage 416 to cool the leading edge 316. In one exemplary embodiment, air flows from the first passage 410 to the leading edge passage 416 such that the cooling air impinges upon the leading edge 316. After striking the internal surface of the leading edge 316, the air, which may now be considered spent air, may exit the leading edge passage 416 through holes (not shown) in the side walls out of the airfoil 310, tip slots 336 in the blade tip 320 out of the airfoil 310, or through another exit location. Generally, however, after striking and cooling the leading edge 316, spent air flows through the leading edge passage 416 in a radial outward direction to the tip slots 336 in the blade tip 320.

The second cooling circuit 430 includes a set of passages 440 arranged a serpentine configuration through the airfoil 310, although other embodiments may have alternate configurations. In particular, passages 440 include a first leg 442 extending from the source passage 432, initially in a generally radial direction, and transitioning at transition 444 into a second leg 446, which also extends in a radial direction. The second leg 446 transitions at transition 448 to a third leg 450. The first leg 442 is at least partially formed by internal wall 414 and internal wall 443. The second leg 446 is at least partially formed by internal wall 443 and internal wall 452. The third leg 450 is at least partially formed by internal wall 452 and internal wall 454 and bounded at a radial end at tip cap 330. The transition 444 is bounded in a radial direction by tip cap 330.

Generally, the internal walls 414, 443, 452, 454 extend substantially or completely in the radial orientation such that the legs 442, 446, 450 similarly extend substantially or completely in the radial orientation. In one embodiment, internal walls 443, 452 are generally solid, while internal walls 443, 452 are formed with holes or nozzles 418, 456 that allow cooling air therethrough. For example, the holes 456 in internal wall 452 enable cooling air to pass from the third leg 450 into a trailing edge chamber (or passage) 460. As such, the holes 456 may be referred to as trailing edge crossover holes.

The trailing edge chamber 460 extends in the chordwise direction from the internal wall 454 to the trailing edge 318 and in the radial direction from the root 360 or platform 350 to the tip cap 330. An array of pins 464 may be arranged in the chamber 460. In one embodiment, the pins 464 are circular and generally extend in a tangential direction, although other arrangements may be provided.

Accordingly, during operation, a portion of cooling air flows through the source passage 432, through the first leg 442, through transition 444, through the second leg 446, through transition 448, and through the third leg 450. The transition 444 is in fluid communication with tip slots 336 such that a portion of the cooling air flowing through the transition 444 exits the cooling circuit 430 radially through the tip slots 336, while the remainder flows into the second leg 446. Similarly, tip slots 336 are in fluid communication with the radial end of the third leg 450 such that a portion of the cooling air flowing through the third leg 450 exits the cooling circuit 430 radially through the tip slots 336, while the remainder flows into the trailing edge chamber 460 through the holes 456 in internal wall 454. In the trailing edge chamber 460, a portion of the cooling air may flow radially out of the airfoil 310 through tip slots 336, and the remainder may flow in a chordwise direction out of the airfoil 310 through trailing edge slots 384.

Figure 5:
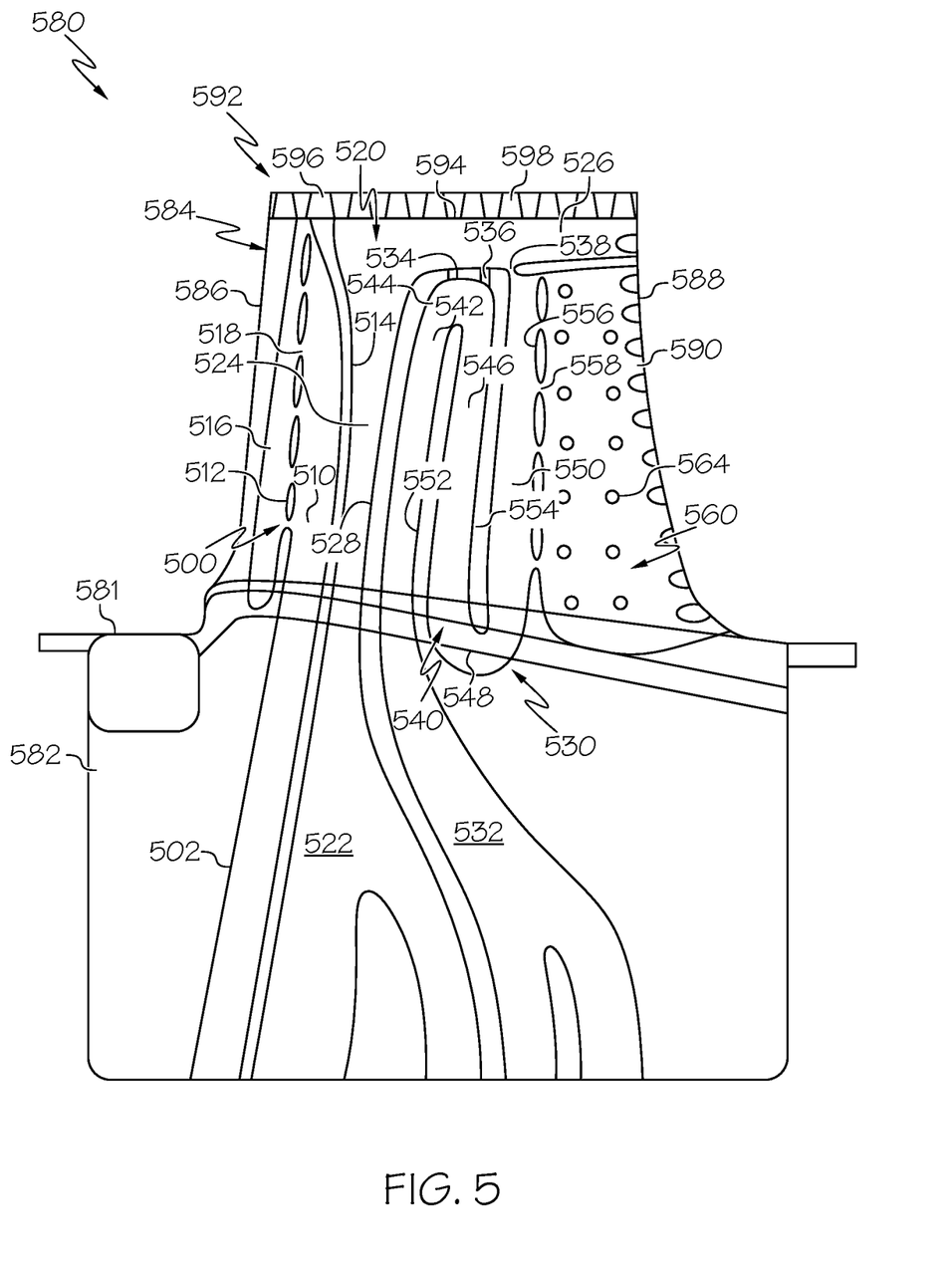
FIG. 5 is a cross-sectional view of a turbine rotor blade in accordance with another exemplary embodiment.

FIG. 5 is a partial cross-sectional view of a rotor blade 580, which unless otherwise noted is similar to the rotor blade 260 of FIG. 3. As above, the rotor blade 580 includes a platform 581, root 582, and airfoil 584 with leading edge 586, trailing edge 588 with slots 590, and blade tip 592 with a tip cap 594 and slots 596 through one or more tip extensions 598. FIG. 5 particularly shows the interior structure of the rotor blade 580 that forms an internal cooling system with three cooling circuits 500, 520, 530, although any number of cooling circuits may be provided. The cooling circuits 500, 520, 530, direct cooling air from passages 502, 522, 532 in the root 582 and/or rotor discs (not shown) to cool designated portions of the airfoil 584. In this embodiment, cooling circuit 500 receives cooling air from source passage 502; cooling circuit 520 receives cooling air from source passage 522; and cooling circuit 530 receives cooling air from source passage 532. Such cooling air may be obtained as bleed flow from the compressor section 130 (FIG. 1). As described below, the cooling circuits 500, 520, 530 are formed by the pressure and suction side walls and internal structures that direct the air flow through the airfoil 584. Generally, the first cooling circuit 500 may be considered a leading edge cooling circuit; the second cooling circuit 520 may be considered a central cooling circuit; and the third cooling circuit 530 may be considered a trailing edge cooling circuit (or a combination of a central cooling circuit and a trailing edge cooling circuit).

The first cooling circuit 500 includes a first passage (or chamber) 510 extending in a generally radial direction, as shown in FIG. 5. The first passage 510 is partially formed by internal walls 512, 514, although other embodiments may have alternate configurations. The forward or leading internal wall 512 forms a leading edge passage (or chamber) 516 with the interior surfaces of the pressure and suction side walls at the leading edge 586. As shown, the leading edge passage 516 extends in a radial direction along the length of the leading edge 586. As described in greater detail below, the leading internal wall 512 has a number of holes (or nozzles) 518 such that the first passage 510 and the leading edge passage 516 are in fluid communication.

Accordingly, during operation, a first portion of cooling air flows through the first passage 510, through the holes 518 in the internal wall 512, and through the leading edge passage 516 to cool the leading edge 586. In one exemplary embodiment, air flows from the first passage 510 to the leading edge passage 516 such that the cooling air impinges upon the leading edge 586. After striking the internal surface of the leading edge 586, the air may exit the leading edge passage 516 through holes (not shown) in the side walls out of the airfoil 584, slots 596 in the blade tip 592 out of the airfoil 584, or through another exit location. Generally, however, after striking and cooling the leading edge 586, spent air flows through the leading edge passage 516 in a radial outward direction to slots 596 in the blade tip 592.

The second cooling circuit 520 includes a passage (or leg) 524 extending from the passage 522 in a radial direction to the tip cap 594. At the blade tip 592, the radial passage 524 extends in a chordwise orientation as a tip cap passage. In one embodiment, the passage 524 is at least partially formed by internal wall 514, internal wall 528, and the tip cap 594, and tip cap passage 526 is at least partially formed by the tip cap 594 and an internal wall 534 that extends in a generally chordwise orientation. Accordingly, during operation, cooling air flows through source passage 522 and through radial passage 524. A portion of the cooling air flows through tip slots 596 in the tip 592, while the remainder flows in a chordwise aft direction through tip cap passage 526. The tip cap passage 526 is in fluid communication with the tip slots 596 and trailing edge slots 590 on the trailing edge 588 such that a portion of the cooling air in the tip cap passage 526 flows through the tip slots 596 and a portion flows through the trailing edge slots 590 on the trailing edge 588.

The third cooling circuit 530 includes a set of passages 540 arranged in a serpentine configuration through the airfoil 584, although other embodiments may have alternate configurations. In particular, passages 540 include a first leg 542 extending from the source passage 532, initially in a generally radial outward direction, and transitioning at transition 544 into a second leg 546, which also extends in a radial inward direction. The second leg 546 transitions at transition 548 to a third leg 550.

The first leg 542 is at least partially formed by internal wall 528 and internal wall 552, and transition 544 is at least partially bounded by internal wall 534. The second leg 546 is at least partially formed by internal wall 552 and internal wall 554. The third leg 550 is at least partially formed by internal wall 554 and internal wall 556.

Generally, the internal walls 528, 552, 554, 556 extend substantially or completely in the radial orientation such that the legs 542, 546, 550 similarly extend substantially or completely in the radial orientation. In one embodiment, internal walls 528, 552, 555 are generally solid, while internal wall 556 is formed with holes or nozzles 558 that allow cooling air to pass therethrough in a trailing edge chamber 560. In this embodiment, internal wall 534 includes holes 536 that fluidly couple the transition 544 to the tip cap passage 526, and internal wall 534 further includes holes 538 that fluidly couple the third leg 550 to the tip cap passage 526.

The trailing edge chamber 560 extends in the chordwise orientation from the internal wall 556 to the trailing edge 588 and in the radial orientation from the root 582 to the internal wall 534. An array of pins 564 may be arranged in the chamber 560. In one embodiment, the pins 564 are circular and generally extend in a tangential orientation, although other arrangements may be provided.

Accordingly, during operation, a portion of cooling air flows through the source passage 532, through the first leg 542, through transition 544, through the second leg 546, through transition 548, and through the third leg 550. A portion of the cooling air flowing through the transition 544 exits the cooling circuit 530 radially through the holes 536 into the tip cap passage 526 of cooling circuit 520, while the remainder flows into the second leg 546. The cooling air flows through the second leg 546, through the transition 548, and into the third leg 550. A portion of the cooling air flowing through the third leg 550 exits the passage 540 radially through the holes 536 into the tip cap passage 526, and the remainder flows into a trailing edge chamber 560 through the holes 558 in internal wall 556. The cooling air within the trailing edge chamber 560 is directed out of the airfoil 584 through trailing edge slots 590.

Figure 6:
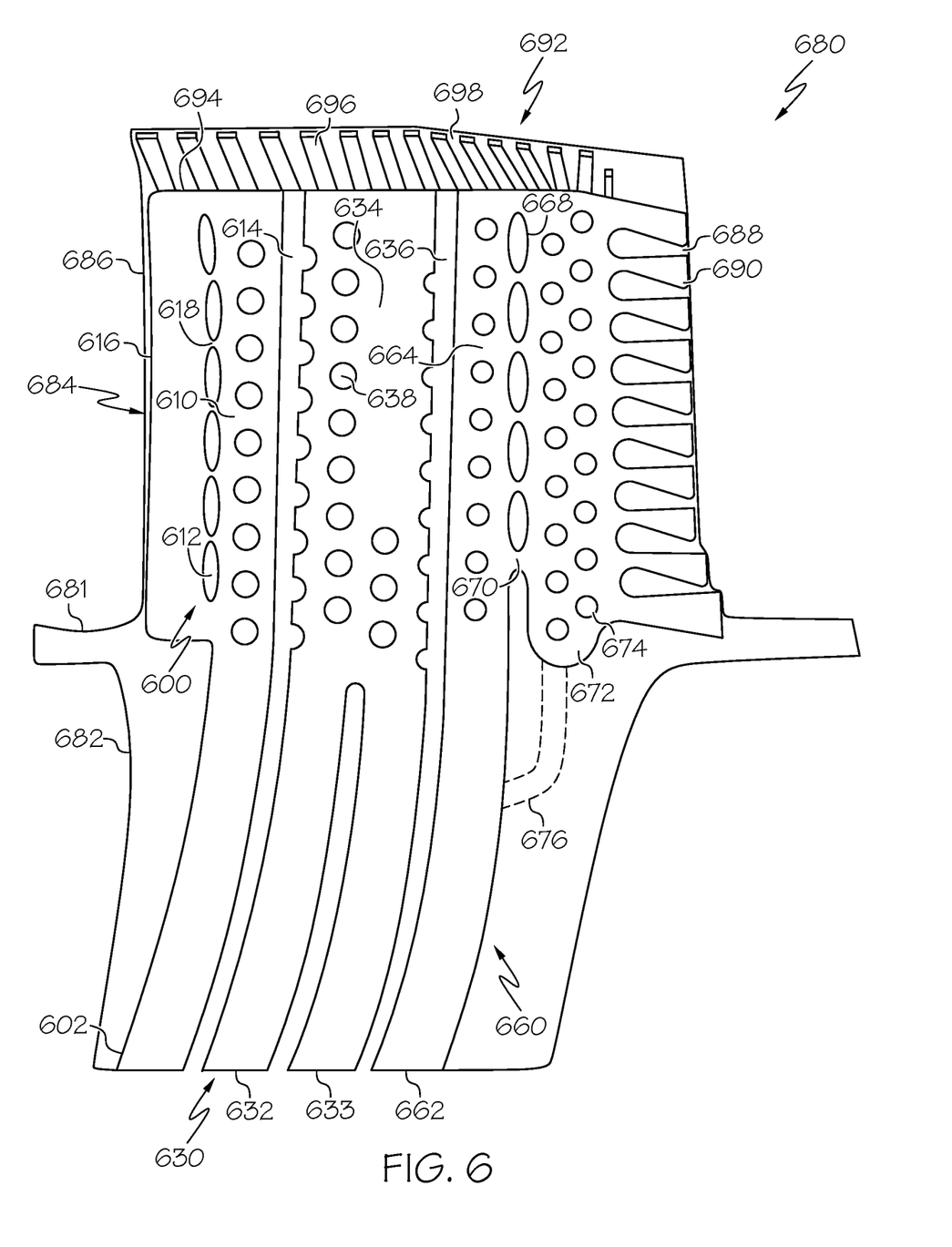
FIG. 6 is a cross-sectional view of a turbine rotor blade in accordance with a further exemplary embodiment.

FIG. 6 is a partial cross-sectional view of a rotor blade 680, which unless otherwise noted is similar to the rotor blade 260 of FIG. 3. As above, the rotor blade 680 includes a platform 681, root 682, and airfoil 684 with leading edge 686, trailing edge 688 with slots 690, and blade tip 692 with a tip cap 694 with slots 696 through tip extensions 598. FIG. 6 particularly shows the interior structure of the rotor blade 680 that forms an internal cooling system with three cooling circuits 600, 630, 660 although any number of cooling circuits may be provided. The cooling circuits 600, 630, 660 direct cooling air from passages 602, 632, 633, 662 in the root 682 and/or rotor discs (not shown) to cool designated portions of the airfoil 684. In this embodiment, cooling circuit 600 receives cooling air from source passage 602; cooling circuit 630 receives cooling air from source passage 632 and/or source passage 633; and cooling circuit 660 receives cooling air from source passage 662. Such cooling air may be obtained as bleed flow from the compressor section 130 (FIG. 1). As described below, the cooling circuits 600, 630, 660 are formed by the pressure and suction side walls and internal structures that direct the air flow through the airfoil 684. Generally, the first cooling circuit 600 may be considered a leading edge cooling circuit; the second cooling circuit 630 may be considered a central cooling circuit; and the third cooling circuit 660 may be considered a trailing edge cooling circuit.

The first cooling circuit 600 includes a first passage (or chamber) 610 extending in a generally radial orientation, as shown in FIG. 6. The first passage 610 is partially formed by internal walls 612, 614, although other embodiments may have alternate configurations. The forward or leading internal wall 612 forms a leading edge passage (or chamber) 616 with the interior surfaces of the pressure and suction side walls at the leading edge 686. As shown, the leading edge passage 616 extends in a radial orientation along the length of the leading edge 686. As described in greater detail below, the leading internal wall 612 has a number of holes (or nozzles) 618 such that the first passage 610 and the leading edge passage 616 are in fluid communication.

Accordingly, during operation, a first portion of cooling air flows through the first passage 610, through the holes 618 in the internal wall 612, and through the leading edge passage 616 to cool the leading edge 686. In one exemplary embodiment, air flows from the first passage 610 to the leading edge passage 616 such that the cooling air impinges upon the leading edge 686. After striking the internal surface of the leading edge 686, the air may exit the leading edge passage 616 through holes (not shown) in the side walls out of the airfoil 684, slots 696 in the blade tip 692 out of the airfoil 684, or through another exit location. Generally, however, after striking and cooling the leading edge 686, spent air flows through the leading edge passage 616 in a radial outward direction to slots 696 in the blade tip 692.

The second cooling circuit 630 includes a passage 634 extending from the passages 632, 633 in a radial outward direction to the tip cap 694. In one embodiment, the passage 634 is at least partially formed by internal wall 614, internal wall 636, and the tip cap 694. Accordingly, during operation, cooling air flows through source passages 632, 633, through radial passage 634, and through tip slots 696 in the tip 692. The passage 634 may further includes one or more pins 638 extending in a tangential orientation through the passage 634 between side walls.

The third circuit 660 is formed by a first passage or chamber 664 that extends in the radial orientation from the internal wall 636 to internal wall 668. The radial end of the passage 664 is fluidly coupled to the tip slots 696 such that a portion of the cooling air flows radially out of the airfoil 684. The remaining portion flows through holes 670 in wall 668 into chamber 672.

Chamber 672 extends in a radial orientation between the platform 681 or root 682 and in a chordwise orientation between wall 668 and the trailing edge 688. An array of pins 674 may be arranged in the chamber 672. In one embodiment, the pins 674 are circular and generally extend in a tangential orientation, although other arrangements may be provided.

Accordingly, during operation, cooling air flows through the source passage 662 and through the passage 664. A portion of the cooling air within passage 664 flows radially outward through the tip slots 696, and the remaining portion flows through holes 670 in wall 668 into chamber 672. A portion of the cooling air within chamber 672 flows radially outward through the tip slots 696, and the remaining portion flows through trailing edge slots 690 in the trailing edge 688.

In one exemplary embodiment, the chamber 672 may additionally receive cooling air from passage 676, which is fluidly coupled to the source passage 662. In other embodiments, this passage 676 may be omitted.

The rotor blades (e.g., blades 260, 580, 680) described above operate to mitigate or prevent dust accumulation within the respective cooling passages by minimizing the surface on which the dust may be deposited. Additional details regarding the design, implementation, and resulting structure associated with such functionality are described below within the context of a method 700 of FIG. 7.

Figure 7:
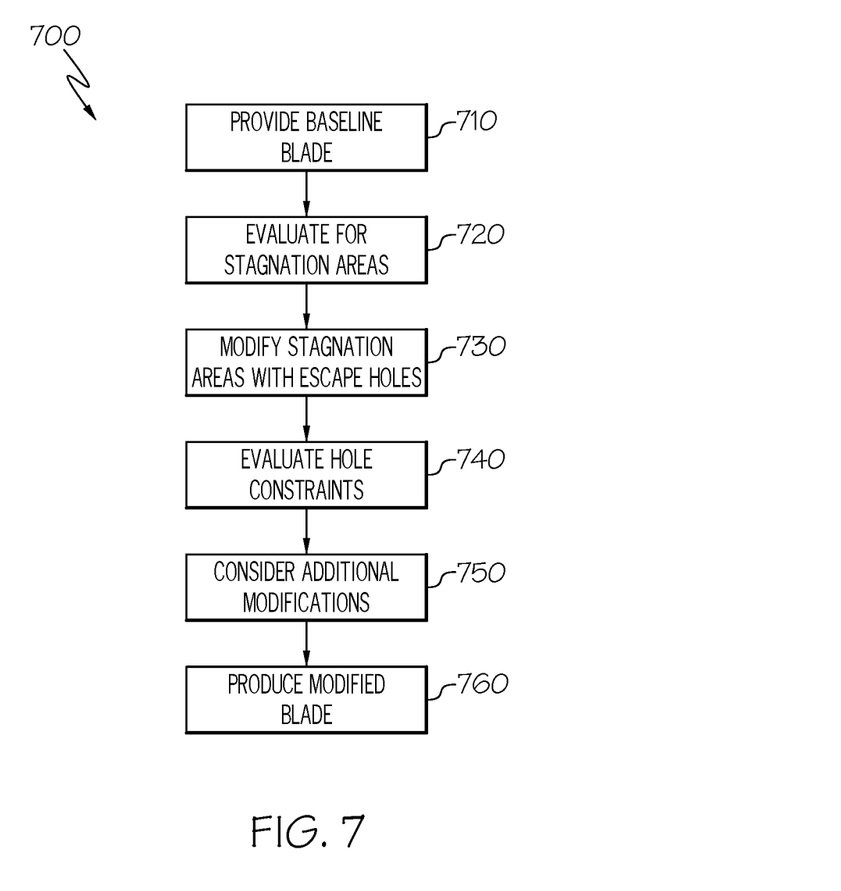
FIG. 7 is a flowchart of a method for producing a turbine rotor blade in accordance with an exemplary embodiment.

In an initial design step 710, a baseline blade with is considered. The baseline blade may be designed based on various parameters, including operational suitability, durability, cooling characteristics, and the like. Generally, in baseline design for cooling turbine blades, the cooling configuration attempts to keep the cooling flow inside the blade as long as possible before the cooling flow is directed out of the blade, thereby enabling a particular volume of cooling flow to cool as much of the blade as possible. This typically results in a serpentine cooling scheme with numerous bends and turns. Additionally, cooling design may partition the total cooling flow to direct flow where it is needed, which may result in horizontal walls to maintain distinct flow paths. One such example is a tip flag. As described in greater detail below, exemplary embodiments may generally maintain this design intent while mitigating or preventing dust accumulation that may otherwise occur from such structures. As such, the rotor blades typically include one or more internal cooling circuits (e.g., circuits 400, 430, 500, 530, 560, 600, 630, 660) that direct cooling air to various locations.

In a subsequent step 720, the internal walls or surfaces of the cooling circuits are evaluated for potential areas of stagnation. Such areas, if unaddressed, may result in dust being introduced into the cooling circuit by the cooling air being deposited and remaining within the cooling circuit. The potential stagnation areas may be identified in a number of ways.

In one example, potential stagnation areas may correspond to internal walls or surfaces opposing the flow path that extend in the chordwise-axial plane, which may be referred to in the discussion below as a "flat surface" in reference to the views of FIGS. 4-6. As further examples, potential stagnation areas may correspond to internal walls or surfaces opposing flow path having an approximately constant radius of curvature relative to the engine centerline. In some embodiments, these areas may be limited to flat surfaces and approximately constant radius of curvature surfaces that oppose the flow paths oriented in a radial outward direction.

In one embodiment, the potential stagnation areas may be walls or surfaces that oppose cooling flow having angles of greater than 90°, such as serpentine paths that redirect flow approximately 180° or any passage that redirects air flow from radially outward to radially inward. The passages directly upstream of such areas may be referred to below as a "closed radial passage."

Generally, the stagnation areas may corresponding to areas in which the flow changes direction, for example around corners or when the flow velocity in one direction slows down (e.g., as a result of radial friction) and the flow velocity in another direction speeds up (e.g., in the axial direction) or vice versa. In other words, the term "stagnation" may refer to a flow region where the direction of flow changes, e.g., flow velocity comes to the rest or slows down in one direction, changes direction, and picks up velocity in another direction. One such example is areas of flow recirculation, e.g. flow vortices. As such, these areas of flow direction changes with slowing velocity may be identified as stagnation areas.

In further embodiments, the potential stagnation areas may be identified with CFD analysis or other types of testing. For example, areas in which dust is deposited during testing may be identified and addressed.

Upon identification of potential stagnation areas, the method proceeds to steps 730, 740, 750 in which the potential stagnation areas are addressed to modify the baseline blade. For example, in step 730, the potential stagnation areas are considered for the placement of holes that may prevent or mitigate dust deposition. In one embodiment, such holes may be referenced below as "escape holes." Generally, the escape holes function to "open" closed radial passages within the cooling circuits. The holes remove surface area on which dust may be deposited and modify cooling flow characteristics to prevent air flow from stagnating in a particular area. The holes may be various shapes, sizes, and orientations. For example, the holes may be round, oval, or elongated, such as slots. Further examples and descriptions are discussed below.

As an example, referring briefly to FIG. 4, tip slots 336 may be considered escape holes for radial first passage 410 to prevent dust from stagnating along the tip cap 330. In effect, the tip slots 336 function to open the otherwise closed radial first passage 410 such that air (and dust) may flow into the leading edge passage 416 or out of the first cooling circuit 400 through the tip slots 336. The tip slots 336 perform a similar function with respect to the radial passages of first leg 442 and third leg 450 to prevent or mitigate radially outward cooling flow from stagnating along the tip cap 330. As a result, the rotor blade 260 of FIG. 4 does not have any "closed" radial passages or any uninterrupted flat chordwise surfaces on which radially outward flowing cooling air may stagnate and deposit dust.

As another example, referring briefly to FIG. 5, tip slots 596 may be considered escape holes for radial first passage 510 of first cooling circuit 500, radial passage 524 of second cooling circuit 520, and radial passage formed by leg 550 of the third cooling circuit 530. In effect, the tip slots 596 function to open the otherwise closed radial passages 510, 524, 550 to prevent or mitigate radially outward cooling flow from stagnating along the tip cap 594. Additionally, holes 536 and holes 538 in wall 534 may be considered escape holes for the radial passages formed by leg 542 and leg 550 as cooling air flows through the third cooling circuit 530. Even though these holes 536, 538 direct air into a further passage 526, the holes 536, 538 prevent or mitigate stagnations. As a result, the rotor blade 580 of FIG. 5 does not have any "closed" radial passages or any uninterrupted flat chordwise surfaces on which radially outward flowing cooling air may stagnate and deposit dust.

As another example, referring briefly to FIG. 6, tip slots 696 may be considered escape holes for radial first passage 610 of first cooling circuit 600, radial passage 634 of the second cooling circuit 630, and radial passage 664 of the third cooling circuit 660. In effect, the tip slots 696 function to open the otherwise closed radial passages 610, 634, 664 to prevent or mitigate radially outward cooling flow from stagnating along the tip cap 694. As a result, the rotor blade 680 of FIG. 6 does not have any "closed" radial passages or any uninterrupted flat chordwise surfaces on which radially outward flowing cooling air may stagnate and deposit dust.

Returning to the method 700 of FIG. 7, the proposed modifications may be subject to one or more constraints. As such, in a further step 740, the escape holes are evaluated with respect to one or more constraints. For example, the number of escape holes on a flat or chordwise surface may be constrained by various considerations, such as manufacturing or structural capabilities. In one example, the minimum distance between two adjacent escape holes is twice the hole diameter. In some embodiment, the ratio of length to diameter may also be provided to facilitate this function. For example, the ratio of length to diameter of the escape holes, particularly tip slots, may be approximately three.

An additional parameter that may be considered in step 740 is flow characteristics. Generally, the amount of flow discharging from a hole is proportional to the hole opening area and the pressure ratio across the opening. This issue may be addressed by providing the hole with converging cross-sectional areas (e.g., maximizing the inlet area and decrease the cross-sectional area to converge along the length to the exit). As examples, the tip slots 336, 596, 696 (FIGS. 4-6) may converge in cross-sectional area in the direction to flow. In some examples, converging tip slots may also reduce the space on the tip cap between the inlets of adjacent holes, thereby also reducing a surface area on which dust may be deposited. As a further example, tip cap passage 526 may converge in cross-sectional area by angling wall 534 relative to a chordwise orientation to decrease the area of resulting trailing edge slot 590, and thus, decrease the pressure ratio.

Again returning to the method 700 of FIG. 7, in a further step 750, additional parameters may be implemented in a manner that reduces or eliminates stagnation areas. The step 750 may be performed in addition to or in lieu of steps 730, 740. In step 750, the internal surfaces may be curved or reoriented to reduce potential stagnation areas. For example, walls 514, 534 in FIG. 5 are angled relative to a chordwise orientation, thereby preventing or mitigating possible stagnation issues. As such, this surface curvature guides the flow to change direction from a radial orientation to an axial or chordwise orientation (and vice-versa) without coming to an abrupt stagnation.

As a final step 760, the rotor blade in view of steps 710, 720, 730, 740 is implemented, e.g., by manufacturing the blade. Additional details about the resulting rotor blades are discussed below.

Generally, each of the rotor blades discussed above is a blade with internal cooling circuits that provide metered cooling flow to various locations within and on the blade. For example, such blades generally include forward impingement, tip caps, multi-passage and/or multi-circuits, and trailing edge passages. In some examples, the rotor blades may additionally include inter-chamber or inter-passage pins and/or serpentine passages.

Additionally, the rotor blades resulting from the method of FIG. 7 and depicted in FIGS. 4-6 provide cooling circuits that prevent or mitigate dust deposition by avoiding internal surfaces on which cooling flow may stagnate. In some embodiments, all such internal surfaces are eliminated or avoided.

As one example, the rotor blade includes no internal surfaces that oppose cooling flow in a radial outward direction having angles of greater than 90°, such as serpentine paths that redirect flow approximately 180° or any passage that redirects air flow from radially outward to radially inward.

In some examples, the rotor blade is free from closed radial passages that direct cooling flow in a radial outward direction. In other words, such passages may include escape holes at or proximate to the radially outward wall to prevent or mitigate potential stagnation.

In further examples, the rotor blade may be considered to be free from uninterrupted internal walls or surfaces extending generally parallel to the chordwise direction. In other words, the rotor blades are free from flat surfaces on which radially outward cooling flow may otherwise encounter stagnation.

In a further example, the rotor blade may be configured to direct at least a predetermined percentage of dust particles and/or cooling air flow through the tip slots without adversely impacting the amount or distribution of flow through the blade. In one embodiment, the rotor blade may expel at least 25% of dust within the cooling air (or 25% of the total volume of cooling air) through the tip slots. In other embodiments, the rotor blade may expel at least 35% of dust within the cooling air (or 35% of the total volume of cooling air) through the tip slots.

In a further example, the rotor blade may be configured such that the tip slots form at least a predetermined amount of the blade tip. For example, at least 33% of one or both tip extensions along the chordwise length from leading edge to trailing edge may be collectively formed by tip slots. In another example, at least 50% of one or both tip extensions along the chordwise length from leading edge to trailing edge may be collectively formed by tip slots.

Accordingly, turbine rotors with improved with the dust removal characteristics, and thus improved airfoil cooling characteristics, are provided. Several cooling schemes are discussed herein that provide cooling to the "edges" of an axial turbine blade operating in a high temperature environment in which leading edge, trailing edge, and tip cooling is desired. Dust that does not exit though film holes, or the trailing edge, will be directed to the tip of the blade due to the cooling flow and centrifugal force. Since there are no other internal surfaces for the particles to significantly accumulate, dust is expelled through the tip slots. Although airfoils with dust removal characteristics are described above with respect to a turbine blade, such characteristics may also be incorporated into stator airfoils. The internal cooling circuits described above are exemplary configuration and generally correspond to a high effectiveness cooled turbine blade or vane. Other types and configurations of cooling circuits may be provided, including more integrated or isolated cooling circuits, to optimize flow and heat transfer characteristics of the respective flow circuit. Various pins, cross-over holes, turning vanes, turbulators, depressions, and accelerators may be provided in the internal cooling circuits as necessary or desired. Further, although the cooling circuits may be described above as separate circuits, the various cooling circuits may be integrated with one another or otherwise be in flow communication.

Exemplary embodiments of the turbine airfoil discussed above have resulted in an ability to increase engine temperature, thereby improving fuel consumption and power density. The airfoils may be produced by any suitable manufacturing techniques, including casting, injection molding, and/or rapid prototyping. Computational fluid dynamic (CFD) analysis can additionally be used to optimize the location and orientation of the above-referenced grooves and cooling holes. Exemplary embodiments promote the service life and/or enhanced performance in a cost-effective manner. Each of the exemplary embodiments discussed above may be used in combination with one another. The turbine airfoils produced according to exemplary embodiments may find beneficial use in many industries including aerospace, but also including industrial applications such as electricity generation, naval propulsion, pumping sets for gas and oil transmission, aircraft propulsion, automobile engines, and/or stationary power plants.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An airfoil for a rotor blade in a gas turbine engine, comprising:
    a first side wall;
    a second side wall joined to the first side wall at a leading edge and a trailing edge, the first and second side walls extending in a radial outward direction from a base coupled to an airfoil platform;
    a tip cap extending between the first and second side walls such that the tip cap and at least portions of the first and second side walls form a blade tip; and
    an internal cooling system arranged within the first and second side walls configured to direct cooling air from one or more source passages, through the airfoil, and out of the airfoil, the internal cooling system includes a leading edge cooling circuit, and a trailing edge cooling circuit, the internal cooling system further including tip slots formed in the blade tip and trailing edge slots formed in the trailing edge and the tip slots are formed in the blade tip to extend from the leading edge to the trailing edge,
    wherein the leading edge cooling circuit, and the trailing edge cooling circuit are formed by a plurality of internal passages fluidly coupled to the one or more source passages, and each of the internal passages within the leading edge cooling circuit, and the trailing edge cooling circuit is bounded in the radial outward direction with a surface that has at least one escape hole or that is positively angled in the radial outward direction relative to a chordwise axis, and the leading edge cooling circuit includes:
        a first leading radial passage extending in the radial outward direction and at least partially defined by a first leading radial wall in a chordwise aft direction, the tip cap in the radial outward direction, and a second leading radial wall in a chordwise forward direction; and
        a second leading radial passage at least partially defined by the leading edge in the chordwise forward direction, the tip cap in the radial outward direction, and the second leading radial wall in the chordwise aft direction, and the second leading radial wall includes a plurality of cooling holes that fluidly couple the first leading radial passage to the second leading radial passage and the tip slots in the blade tip defined along the second leading radial passage form the at least one escape hole for the second leading radial passage;
    the trailing edge cooling circuit includes:
        a first set of serpentine passages formed by a first trailing radial passage extending in the radial outward direction from the one or more source passages, a second trailing radial passage extending in a radial inward direction from the first trailing radial passage at a first transition, and a third trailing radial passage extending from the second trailing radial passage in the radial outward direction, the first trailing radial passage defined in the chordwise forward direction by the first leading radial wall and at least partially by an internal wall in the chordwise aft direction and the third trailing radial passage extending in the radial outward direction and being formed by a first radial wall in the chordwise forward direction and a second radial wall in the chordwise aft direction; and
        a trailing edge chamber being at least partially formed by the second radial wall in the chordwise forward direction and the trailing edge in the chordwise aft direction, the second radial wall defining holes that fluidly couple the third trailing radial passage to the trailing edge chamber,
    wherein the trailing edge chamber is fluidly coupled to the trailing edge slots and is bounded in the radial outward direction by the tip cap such that at least a portion of the tip slots form the at least one escape hole for the trailing edge chamber.

2. The airfoil of claim 1, wherein at least one wall bounding each of the internal passages within the leading edge cooling circuit, and the trailing edge cooling circuit in the radial outward direction includes the at least one escape hole.

3. The airfoil of claim 1, wherein the second trailing radial passage is fluidly coupled to the first trailing radial passage at the first transition formed by the tip cap such that a second portion of the cooling air in the first trailing radial passage flows through the transition into the second trailing radial passage and in a radial inward direction through the second trailing radial passage.

4. The airfoil of claim 1, wherein the first trailing radial passage is bounded in the radial outward direction by the tip cap such that at least a portion of the tip slots form the at least one escape hole for the first trailing radial passage.

5. The airfoil of claim 1, wherein each of the tip slots have a converging cross-sectional area from an inlet to an outlet.

6. The airfoil of claim 1, wherein each of the trailing edge slots have a converging cross-sectional area from an inlet to an outlet.

7. The airfoil of claim 1, wherein the second trailing radial passage is defined in the chordwise forward direction at least partially by the internal wall and at least partially by the first radial wall in the chordwise aft direction.

8. An airfoil for a rotor blade in a gas turbine engine, comprising:
a first side wall;
a second side wall joined to the first side wall at a leading edge and a trailing edge, the first and second side walls extending in a radial outward direction from a base coupled to an airfoil platform;
a tip cap extending between the first and second side walls such that the tip cap and at least portions of the first and second side walls form a blade tip; and
an internal cooling system arranged within the first and second side walls configured to direct cooling air from one or more source passages, through the airfoil, and out of the airfoil, the one or more source passages including at least a first source passage, a second source passage, a third source passage and a fourth source passage, the cooling air received at a first source inlet of the first source passage, a second source inlet of the second source passage, a third source inlet of the third source passage and a fourth source inlet of the fourth source passage,
wherein the internal cooling system includes a leading edge cooling circuit, a central cooling circuit, and a trailing edge cooling circuit, the internal cooling system further including tip slots formed in the blade tip and trailing edge slots formed in the trailing edge, and
wherein the leading edge cooling circuit, the central cooling circuit, and the trailing edge cooling circuit are formed by a plurality of internal passages fluidly coupled to the one or more source passages, and wherein each of the internal passages within the leading edge cooling circuit, the central cooling circuit, and the trailing edge cooling circuit is bounded in the radial outward direction with a surface that has at least one escape hole or that is positively angled in the radial outward direction relative to a chordwise axis and the leading edge cooling circuit includes:
a first leading radial passage extending in the radial outward direction and at least partially defined by a first radial wall in a chordwise aft direction, the tip cap in the radial outward direction, and a second radial wall in a chordwise forward direction, the first leading radial passage fluidly coupled to the first source passage;
a second leading radial passage at least partially defined by the leading edge in the chordwise forward direction, the tip cap in the radial outward direction, and the second radial wall in the chordwise aft direction, and wherein the second radial wall includes a plurality of cooling holes that fluidly couple the first leading radial passage to the second leading radial passage and the tip slots in the blade tip form the at least one escape hole for the second leading radial passage;
the central cooling circuit includes:
a central radial passage to direct the cooling air received by the central cooling circuit from the second source inlet of the second source passage and the third source inlet of the third source passage in the radial outward direction, the central radial passage extending radially outward from the second source passage and the third source passage to the tip cap, the central radial passage defined by the first radial wall in the chordwise forward direction and defined by a first trailing radial wall in the chordwise aft direction, and wherein the first central radial passage is bounded in the radial outward direction by the tip cap such that at least a first portion of the cooling air in the central radial passage flows in the radial outward direction through the tip slots in the blade tip as the at least one escape hole, and
the trailing edge cooling circuit includes:
a first radial passage extending in the radial outward direction and being formed by the first trailing radial wall in the chordwise forward direction and a second trailing radial wall in the chordwise aft direction, the first radial passage fluidly coupled to the fourth source passage;
a trailing edge chamber being formed by the second trailing radial wall in the chordwise forward direction and the trailing edge in the chordwise aft direction, the second trailing radial wall defining holes downstream of the fourth source passage that fluidly couple the first radial passage to the trailing edge chamber; and
a passage that interconnects the trailing edge chamber to the fourth source passage, an inlet of the passage is downstream from the fourth source inlet of the fourth source passage and an outlet of the passage is upstream from a plurality of pins associated with the trailing edge chamber and downstream of the holes of the second trailing radial wall,
wherein the trailing edge chamber is fluidly coupled to the trailing edge slots and is bounded in the radial outward direction by the tip cap such that at least a portion of the tip slots form the at least one escape hole for the trailing edge chamber.

9. The airfoil of claim 8, wherein at least one wall bounding each of the internal passages within the leading edge cooling circuit, the central cooling circuit, and the trailing edge cooling circuit in the radial outward direction includes the at least one escape hole.

10. The airfoil of claim 8, wherein the first radial passage is bounded in the radial outward direction by the tip cap such that at least a portion of the tip slots form the at least one escape hole for the first radial passage.

11. The airfoil of claim 8, wherein the tip slots are formed in the blade tip to extend from the leading edge to the trailing edge and the tip slots in the blade tip defined along the second leading radial passage form the at least one escape hole for the second leading radial passage.

12. The airfoil of claim 8, wherein the inlet of the passage is defined through the second trailing radial wall upstream from the holes that fluidly couple the first radial passage to the trailing edge chamber.

13. A method for producing an airfoil of a rotor blade for a gas turbine engine, comprising the steps of:
providing a baseline airfoil with an internal cooling system defined by internal walls configured to direct cooling air from one or more source passages, through the airfoil, and out of the airfoil, wherein the internal cooling system includes a leading edge cooling circuit, and a trailing edge cooling circuit, the internal cooling system further including tip slots formed in a blade tip to extend from the leading edge to the trailing edge and trailing edge slots formed in a trailing edge, the leading edge cooling circuit includes a first leading radial passage extending in the radial outward direction and at least partially defined by a first leading radial wall in a chordwise aft direction, a tip cap in the radial outward direction, and a second leading radial wall in a chordwise forward direction, and a second leading radial passage at least partially defined by the leading edge in the chordwise forward direction, the tip cap in the radial outward direction, and the second leading radial wall in the chordwise aft direction, and the second leading radial wall includes a plurality of cooling holes that fluidly couple the first leading radial passage to the second leading radial passage, and the trailing edge cooling circuit includes a first set of serpentine passages formed by a first trailing radial passage extending in the radial outward direction from the one or more source passages, a second trailing radial passage extending in a radial inward direction from the first trailing radial passage at a first transition, and a third trailing radial passage extending from the second trailing radial passage in the radial outward direction, the first trailing radial passage defined in the chordwise forward direction by the first leading radial wall and at least partially by an internal wall in the chordwise aft direction and the third trailing radial passage extending in the radial outward direction and being formed by a first radial wall in the chordwise forward direction and a second radial wall in the chordwise aft direction and a trailing edge chamber being at least partially formed by the second radial wall in the chordwise forward direction and the trailing edge in the chordwise aft direction, the second radial wall defining holes that fluidly couple the third trailing radial passage to the trailing edge chamber, the trailing edge chamber fluidly coupled to the trailing edge slots;
evaluating the internal walls and identifying stagnation areas;
providing a modified airfoil from the baseline airfoil by adding escape holes within the internal walls in the stagnation areas, wherein the tip slots form the at least one escape hole for the trailing edge chamber and the tip slots defined along the second leading radial passage form the at least one escape hole for the second leading radial passage; and
producing the modified airfoil.

14. The method of claim 13, wherein the identifying the stagnation areas includes identifying uninterrupted chordwise walls that oppose cooling air flow in a radial outward direction.

15. The method of claim 13, wherein the identifying the stagnation areas include identifying the internal walls that redirect cooling air flow in a radial inward direction.

16. The method of claim 13, wherein the providing the modified airfoil includes forming each of the tip slots and trailing edge slots having a converging cross-sectional area from an inlet to an outlet.

* * * * *